(12) United States Patent
Radet et al.

(10) Patent No.: US 10,152,198 B2
(45) Date of Patent: Dec. 11, 2018

(54) METHOD AND SYSTEM FOR EDITING A PRODUCT ASSEMBLY

(75) Inventors: Emmanuel Denis Radet, Ville d'Avray (FR); Alain Georges Dugousset, Antony (FR); Juba Hadjali, Aulnay-Sous-Bois (FR); Michaël Eric Francois Diguet, Meudon (FR)

(73) Assignee: Dassault Systèmes, Velizy Villacoublay (FR)

( * ) Notice: Subject to any disclaimer, the term of this patent is extended or adjusted under 35 U.S.C. 154(b) by 754 days.

(21) Appl. No.: 12/638,228

(22) Filed: Dec. 15, 2009

(65) Prior Publication Data

US 2011/0145760 A1 Jun. 16, 2011

(51) Int. Cl.
G06F 3/0481 (2013.01)
G06F 3/0482 (2013.01)
G06F 3/0483 (2013.01)
G06T 19/00 (2011.01)

(52) U.S. Cl.
CPC ........ *G06F 3/0482* (2013.01); *G06F 3/04815* (2013.01); *G06T 19/00* (2013.01); *G06T 2200/24* (2013.01)

(58) Field of Classification Search
CPC .... G06F 3/0481; G06F 3/0482; G06F 3/0483; G06F 9/4443; H04N 5/44543
USPC .......................... 715/810, 764, 753
See application file for complete search history.

(56) References Cited

U.S. PATENT DOCUMENTS

| | | | |
|---|---|---|---|
| 5,999,178 A * | 12/1999 | Hwang et al. | 715/787 |
| 6,058,397 A * | 5/2000 | Barrus et al. | |
| 6,122,634 A | 9/2000 | Brodsky et al. | |
| 6,215,494 B1 * | 4/2001 | Teo | 345/418 |
| 6,377,263 B1 * | 4/2002 | Falacara et al. | 345/473 |
| 6,606,105 B1 * | 8/2003 | Quartetti | 715/853 |
| 6,609,122 B1 | 8/2003 | Ensor | |
| 6,628,304 B2 | 9/2003 | Mitchell et al. | |
| 6,714,201 B1 * | 3/2004 | Grinstein et al. | 345/474 |
| 6,847,462 B1 * | 1/2005 | Kacyra et al. | 356/601 |

(Continued)

FOREIGN PATENT DOCUMENTS

| | | |
|---|---|---|
| JP | 2003-016465 | 6/2001 |
| JP | 2004-511829 | 4/2004 |

(Continued)

OTHER PUBLICATIONS

Microsoft Corp, 2001, Windows XP SP2 Screenshots, pp. 1-5.*
Van den Berg, "Web-based collaborative modeling with Spiff," Sep. 2000, Thesis, Delft University of Technology.
Koparanova, M.G., et al., "Completing CAD Data Queries for Visualization," Ideas, pp. 130, International Database Engineering and Applications Symposium (Ideas'02), 2002.

(Continued)

*Primary Examiner* — Kevin L Young
*Assistant Examiner* — Erik V Stitt
(74) *Attorney, Agent, or Firm* — Hamilton, Brook, Smith & Reynolds, P.C.

(57) ABSTRACT

The present invention provides a computer implemented method for editing a product. The product comprises three-dimensional modeled objects. The method comprises the step of displaying a three-dimensional representation of a hierarchy of the three-dimensional modeled objects. The three-dimensional modeled objects are displayed three-dimensionally in the representation. The method further comprises the step of selecting at least one of the displayed three-dimensional modeled objects. The method further comprises the step of performing an action on the selected object. The hierarchy is edited upon the performing of the action.

9 Claims, 11 Drawing Sheets

(56) References Cited

U.S. PATENT DOCUMENTS

| | | | |
|---|---|---|---|
| 7,079,990 B2* | 7/2006 | Haller et al. | 703/2 |
| 7,360,167 B2* | 4/2008 | Hennum et al. | 715/772 |
| 7,639,267 B1* | 12/2009 | Desimone et al. | 345/619 |
| 7,830,377 B1* | 11/2010 | Desimone et al. | 345/420 |
| 7,969,435 B1* | 6/2011 | DeSimone et al. | 345/420 |
| 7,973,788 B2* | 7/2011 | Nonclercq et al. | 345/420 |
| 8,010,909 B1* | 8/2011 | Hanson et al. | 715/853 |
| 8,013,854 B2* | 9/2011 | Delarue et al. | 345/420 |
| 2002/0054166 A1 | 5/2002 | Decombe | |
| 2002/0107892 A1* | 8/2002 | Chittu et al. | 707/514 |
| 2002/0145623 A1 | 10/2002 | Decombe | |
| 2002/0190982 A1* | 12/2002 | Kotcheff et al. | 345/420 |
| 2004/0036698 A1* | 2/2004 | Thurner et al. | 345/619 |
| 2005/0188348 A1* | 8/2005 | Han et al. | 717/105 |
| 2005/0248560 A1 | 11/2005 | Agrawala et al. | |
| 2006/0070005 A1* | 3/2006 | Gilbert et al. | 715/763 |
| 2006/0212790 A1* | 9/2006 | Perantatos et al. | 715/501.1 |
| 2006/0218478 A1* | 9/2006 | Nonclercq et al. | 715/500 |
| 2007/0159480 A1* | 7/2007 | Delarue et al. | 345/427 |
| 2007/0198561 A1* | 8/2007 | Lee et al. | 707/101 |
| 2007/0198581 A1* | 8/2007 | Nonclercq et al. | 707/103 R |
| 2011/0179097 A1* | 7/2011 | Ala-Rantala | G06F 3/0482 707/829 |

FOREIGN PATENT DOCUMENTS

| | | |
|---|---|---|
| KR | 10-2000-0072012 | 12/2000 |
| KR | 10-2002-0021074 | 3/2002 |
| KR | 10-2004-0005903 | 1/2004 |
| WO | WO 98/22866 A1 | 5/1998 |

OTHER PUBLICATIONS

Li, W., et al., "Interactive Image-Based Exploded View Diagrams," *Proceedings of the 2004 Conference on Graphics Interface*, May 17-19, 2004, London, Ontario, Canada.

Driskill, E. and Cohen, E., "Interactive Design, Analysis, and Illustration of Assemblies," *Proceedings of the 1995 Symposium on Interactive 3D Graphics*, Apr. 9-12, Monterey, CA.

Gómez, J.E., "The Digital Space Shuttle, 3D Graphics, and Knowledge Management," *Proceedings of the Siggraph 2003 Conference on Sketches and Applications, in Conjunction with the 30th Annual Conference on Computer Graphics and Interactive Techniques*, Jul. 27, 2003, p. 1, XP002308422.

McKinney, K., et al., "Visualization of Construction Planning Information," 1998 International Conference on Intelligent User Interfaces, IUI '98, XP002111495, pp. 135-138.

Robertson, G.G., et al., "Cone Trees. Animated 3D Visualizations of Hierarchical Information," *In Proceedings of the SIGCHI Conference on Human Factors in Computing Systems: Reaching through Technology*, New Orleans, Louisiana, pp. 189-194 (1991).

"Matrix One: Matrix Basics, Version 6," MatrixOne Inc., 1998, XP002308421, pp. 1-47.

Carrière, J. and Kazman, R., "Research Report: Interacting with Huge Hierarchies: Beyond Cone Trees," Information Visualization, *IEEE Comput. Soc.*, Oct. 30, 1995, pp. 74-81.

European Search Report, International Application No. EP 04 29 3051, dated Dec. 1, 2004.

Hicks, B.J. and Culley, S.J., "An Integrated Modelling Environment for the Embodiment of Mechanical Systems," *Computer-Aided Design*, 34(6):435-451 (2002).

\* cited by examiner

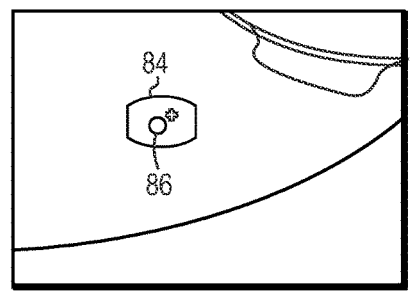
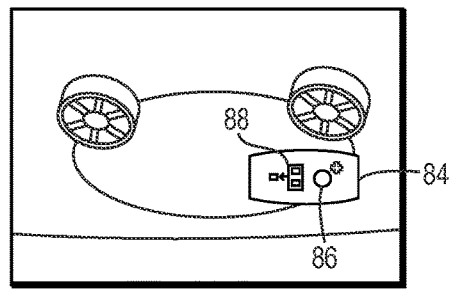
FIG. 17    FIG. 18
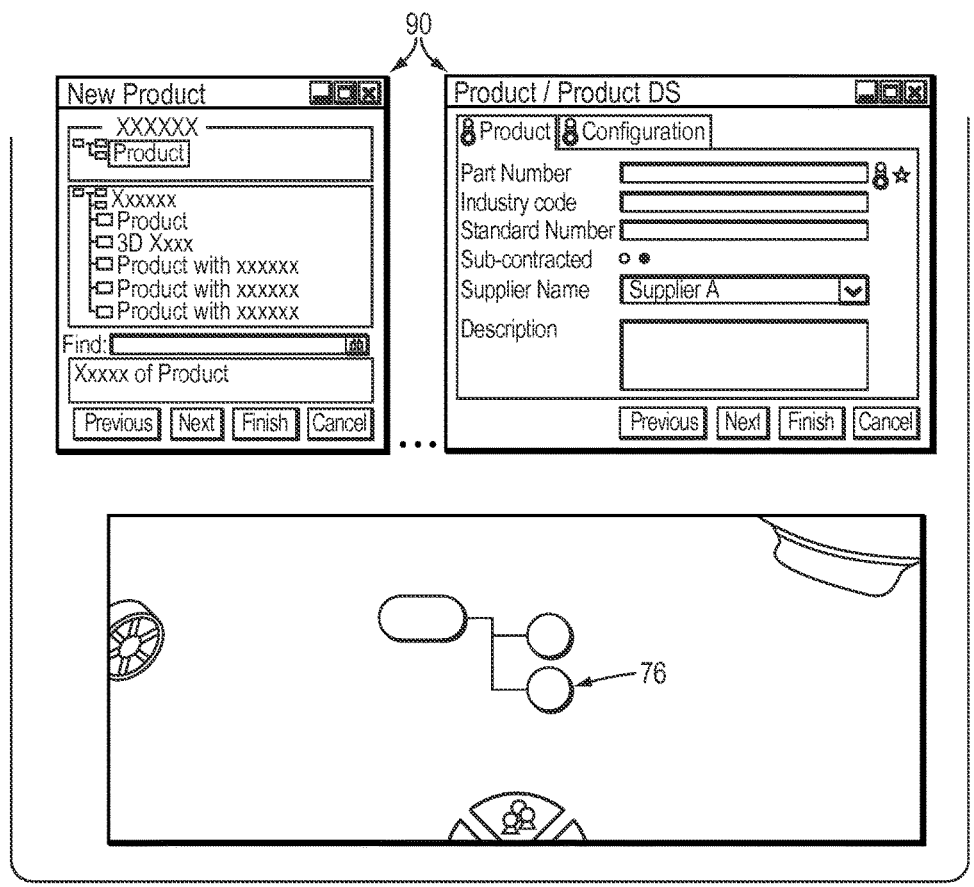
FIG. 19

METHOD AND SYSTEM FOR EDITING A PRODUCT ASSEMBLY

BACKGROUND OF THE INVENTION

The invention relates to the field of computer programs and systems, and more specifically to computer-aided design (CAD) systems and methods.

Computer-aided techniques are known to include Computer-Aided Design or CAD, which relates to software solutions for authoring product design. Similarly, CAE is an acronym for Computer-Aided Engineering, e.g. it relates to software solutions for simulating the physical behavior of a future product. CAM stands for Computer-Aided Manufacturing and typically includes software solutions for defining manufacturing processes and operations.

A number of systems and programs are offered on the market for the design of objects (or parts) or assemblies of objects, forming a product, such as the one provided by Dassault Systemes under the trademark CATIA. These CAD systems allow a user to construct and manipulate complex three dimensional (3D) models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are mostly specifications of geometry. Specifically, CAD files contain specifications, from which geometry is generated, which in turn allow for a representation to be generated. Geometry and representation may be stored in a single CAD file or multiple ones. CAD systems include graphic tools for representing the modeled objects to the designers; these tools are dedicated to the display of complex objects—the typical size of a file representing an object in a CAD system being in the range of one Megabyte per part, and an assembly may comprise thousands of parts. A CAD system manages models of objects, which are stored in electronic files.

In computer-aided techniques, the graphical user interface (GUI) plays an important role as regards the efficiency of the technique. Most of the operations required for manipulating and/or navigating the modeled objects may be performed by the user (e.g. the designers) on the GUI. Especially, the user may create, modify, and delete the modeled objects forming the product, and also explore the product so as to comprehend how modeled objects are interrelated, e.g. via a product structure. Traditionally, these operations are carried out through dedicated menus and icons which are located on the sides of the GUI.

Also known are Product Lifecycle Management (PLM) solutions, which refer to a business strategy that helps companies to share product data, apply common processes, and leverage corporate knowledge for the development of products from conception to the end of their life, across the concept of extended enterprise. By including the actors (company departments, business partners, suppliers, Original Equipment Manufacturers (OEM), and customers), PLM may allow this network to operate as a single entity to conceptualize, design, build, and support products and processes.

Some PLM solutions make it for instance possible to design and develop products by creating digital mockups (a 3D graphical model of a product). The digital product may be first defined and simulated using an appropriate application. Then, the lean digital manufacturing processes may be defined and modeled.

The PLM solutions provided by Dassault Systemes (under the trademarks CATIA, ENOVIA and DELMIA) provides an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Such PLM solutions comprise a relational database of products. The database comprises a set of textual data and relations between the data. Data typically include technical data related to the products said data being ordered in a hierarchy of data and are indexed to be searchable. The data are representative of the modeled objects, which are often modeled products and processes.

Product lifecycle information, including product configuration, process knowledge and resources information are typically intended to be edited in a collaborative way.

In almost all PLM systems, the structure of a product can be managed through Copy/Cut Paste or Insert/Remove operations. This means that a user has to look at a two-dimensional (2D) display, such as a list, a Bill of Materials, or a specification tree to perform his structure operations. Such a prior art system is represented in FIG. 1. With reference to FIG. 1, a user is designing a product 200. Suppose that the user wants to copy object 210, with the purpose, for example, of duplicating it by pasting it elsewhere in the structure product 200. In order to do so, the user needs to open and browse specification tree 250 and select the text reference 220 of object 210. The user may then open a box 230 with a list of action buttons (typically through acting on reference 220 with a haptic device such as a mouse), and select the copy action 240.

Such a method for editing a product is complex because it requires many actions from the user. Furthermore, in these existing solutions, the user has to understand the links between a 2D representation, displayed most of the time as a tree of text references, and 3D representations. If the user needs to modify the structure of a product, he has to use capabilities such as Copy/Cut Paste or Insert/Remove to move a sub-product from one structure node into another one.

These operations are performed most of the time in the 2D view/Specification tree, or sometimes using for the Copy/Cut operation a "select instance only" mode which allows the user to select a leaf instance by its 3D representations. But the paste operation has to be performed on the 2D view which is the only one to show Product/Assembly node.

Accordingly, the art of computer-aided design would benefit from the provision of a computer-implemented method for editing a product which is less complex.

SUMMARY OF THE INVENTION

The present invention advances the art and helps to overcome the aforementioned problems by providing a computer implemented method for editing a product. The product comprises three-dimensional modeled objects. The method comprises the step of displaying a three-dimensional representation of a hierarchy of the three-dimensional modeled objects. The three-dimensional modeled objects are displayed three-dimensionally in the representation. The method further comprises the step of selecting at least one of the displayed three-dimensional modeled objects. The method further comprises the step of performing an action on the selected object. The hierarchy is edited upon the performing of the action.

Preferred embodiments comprise one or more of the following features:
- at the step of displaying, intermediate levels of the representation are displayed in an expanded view, and leaf levels of the representation are displayed in a collapsed view;
- the expanded view comprises a turntable;
- the expanded view of an intermediate level further comprises a snapshot view in the center of the turntable;
- the method further comprises the step of modifying the representation;
- the step of modifying the representation includes at least one of collapsing an intermediate level of the representation, expanding a leaf level of the representation, and turning a turntable;
- the method further comprises a step of presenting a list of actions after the step of selecting, the action performed being chosen among the presented list of actions;
- the step of performing comprises a drag and drop operation of the selected object;
- the action is one or a combination of the actions of the group comprising: a deletion of the selected object from the hierarchy, a deletion of an intermediate level of the hierarchy including the selected object, a duplication of the selected object in the hierarchy, a move of the selected object in the hierarchy, an insertion of another object at an intermediate level of the hierarchy including the selected object, a grouping of the selected object, and an ungrouping of the selected object;
- at least two objects are selected at the step of selecting, the action comprising a grouping of the selected objects;
- all the objects of a same leaf level of the representation are selected at the step of selecting, the action comprising an ungrouping of the selected objects;
- the step of performing modifies the displayed representation of the hierarchy.

The invention also provides a product lifecycle management system comprising a database storing at least one product comprising three-dimensional modeled objects; and a graphical user interface. The graphical user interface is suitable for displaying to a user a three-dimensional representation of a hierarchy of the three-dimensional representation of the modeled objects, and upon selection by the user of at least one of the displayed three-dimensional modeled object, and performing by the user of an action on the selected object, editing the hierarchy; according to the above method.

The invention also provides a computer readable storage medium having recorded thereon instructions for execution by a computer. The instructions comprise means for causing a product lifecycle management system comprising a database storing at least one product comprising three-dimensional modeled objects to display a three-dimensional representation of a hierarchy of the three-dimensional representation of the modeled objects, and upon selection by the user at least one of the displayed three-dimensional modeled object and performing by the user of an action on the selected object, edit the hierarchy; according to the above method.

Thus, the invention offers to a designer means to edit a product with the possibility to reorganize the product directly in 3D using unambiguous 3D representations.

Further features and advantages of the invention will appear from the following description of embodiments of the invention, given as non-limiting examples, with reference to the accompanying drawings listed hereunder.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 3-5 and 8-24 are graphical representations of examples of a method for editing a product.

DETAILED DESCRIPTION OF THE INVENTION

A description of example embodiments of the invention follows.

The teachings of all patents, published applications and references cited herein are incorporated by reference in their entirety.

The invention provides a computer implemented method for editing a product. The product comprises three-dimensional modeled objects. The method comprises the step of displaying a three-dimensional representation of a hierarchy of the three-dimensional modeled objects. The three-dimensional modeled objects are displayed three-dimensionally in the representation. The method further comprises the step of selecting at least one of the displayed three-dimensional modeled objects. The method further comprises the step of performing an action on the selected object. The hierarchy is edited upon the performing of the action. Such a method allows a user to edit the structure of a product easily.

Figure 2:
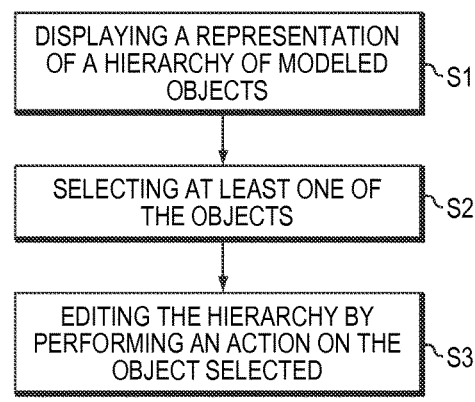
FIG. 2 is a flowchart of a method for editing a product.

A chart of such a method is provided in FIG. 2.

The method is intended for editing a product. A product is the object that the designer intends to produce. A product is typically an assembly of objects. A product may also be a single object. The objects may be parts, assemblies, or other products. A part is a component to be assembled. It typically represents a mechanical component, but is not limited to that. An assembly designates any gathering of parts, preferably a structured gathering. If a product is constituted of other products, then these other products may be referred to as sub-products. These sub-products may themselves be an assembly of parts, assemblies or sub-sub-products. Many variations are possible and within the scope of the invention. Furthermore, the invention is not solely intended to the design of mechanical parts, but it is applicable to any field where computer design is required. For example, the invention is applicable to the field of video games.

In the following description, the term "product" refers to any assembly of objects, an object being an instance of any specification contained in a PLM database. Thus, the product comprises modeled objects. A product is modeled by a hierarchy of the modeled objects it comprises. A hierarchy is a structure defining the relations between the different objects comprised in a product. A hierarchy may in general be modeled by a graph. Such a graph is often, but not necessarily, a tree wherein the root node represents the product, leaf nodes represent the objects and intermediate nodes represent subassemblies of objects. The edition of a product includes any modification of this hierarchy. Such a modification may non-exhaustively include the addition of new objects, the duplication of existing objects, the deletion of existing objects, the reorganization of the hierarchy.

The objects are 3D modeled. In other words, the objects are modeled by geometrical specifications that allow their display in 3D. An object being displayed in 3D allows its viewing from all angles. For example, the object may be handled and turned around any of its axes, or around any axis in the screen. This notably excludes 2D icons, which are not 3D modeled.

The invention method comprises the display of a three-dimensional representation of a hierarchy of the three-dimensional modeled objects (Step S1 in FIG. 2). The three-dimensional modeled objects are displayed three-dimensionally in this representation. The method (Step S2) further comprises the selection of at least one of the displayed three-dimensional modeled objects and the performing of an action on the selected object. The hierarchy is edited upon the performing of the action (by Step S3).

Selecting an object may be performed by the user through a graphical user interface. Typically, the user may select an object by acting on an area of the screen, typically with a haptic device such as a mouse. The area of the screen is allocated to that object and acts as a pointer to the object. As the object is an instance of a specification contained in the database, it itself contains a pointer to the location of its specification. The action on the object is also generally done by the user. However, these steps may be preprogrammed and be performed automatically under certain conditions.

Thus, the invention method provides the user with a tool to edit a product which is more intuitive than the use of text references. As the user may edit the product by selecting an object of the product, which is displayed in 3D in the representation of the hierarchy, and by performing an action directly on it, the user does not need to come and go between the representation and a specification tree. Edition of a product is thus rendered simpler, more graphically intuitive, and takes less time.

Furthermore; as the user is working on a three-dimensional representation of the hierarchy, he may have a global view of the product. Products generally comprise many objects. When representing a hierarchy of the objects of a product in prior art, typically with a 2D tree such as tree 250 of FIG. 1, it is very frequent that the screen is not sized adequately for representing all the objects. In that situation, the user typically needs to scroll down or up the tree for accessing different objects of the product. This is not convenient for the edition of a product. On the contrary, as the hierarchy is represented in 3D, the method does not raise the same issue of fitting the representation of the hierarchy in a screen and therefore is more convenient for the edition of a product.

Figure 1:
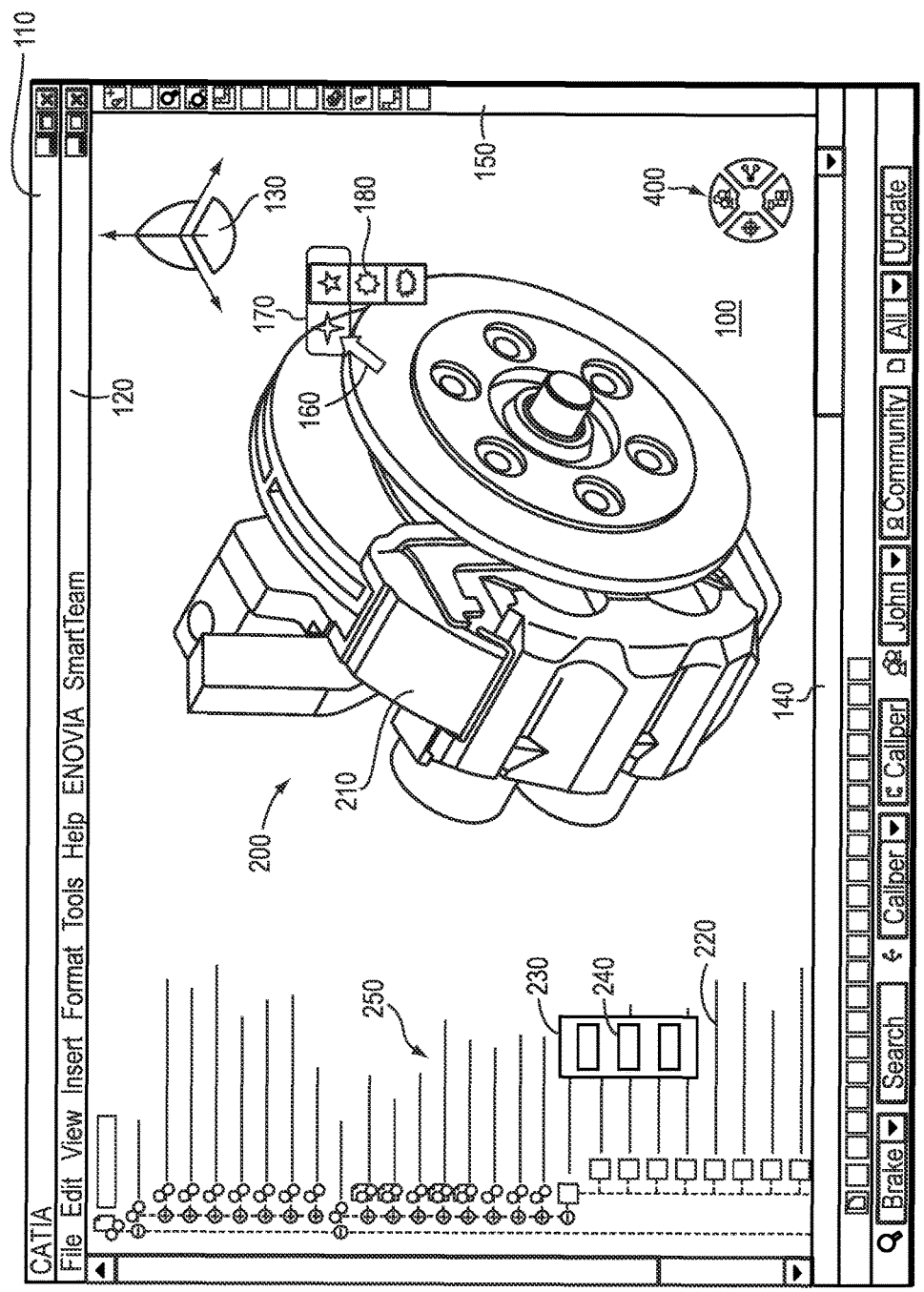
FIG. 1 is a graphical representation of a typical GUI in a CAD system.

In reference to FIG. 1, the exemplified graphical user interface (or GUI) 100 may be a typical CAD-like interface, having standard menu bars 110, 120, as well as bottom and side toolbars 140, 150. Such menu- and toolbars contain a set of user-selectable icons, each icon being associated with one or more operations or functions, as known in the art.

Some of these icons are associated with software tools, adapted for editing and/or working on a modeled product 200 or parts, such as part 210, of product 200 such as that displayed in the GUI 100. Note that the concept of "part" can in fact be generalized to that of "object", wherein an object can be only a "physical" part of the designed product or, more generally, any software tool participating in the design process (but not necessarily "in" the final product).

The software tools may be grouped into workbenches. Each workbench comprises a subset of software tools. In particular, one of the workbenches is an edition workbench, suitable for editing geometrical features of the modeled product 200. In operation, a designer may for example pre-select a part of the object 200 and then initiate an operation (e.g. change the dimension, color, etc.) or edit geometrical constraints by selecting an appropriate icon. For example, typical CAD operations are the modeling of the punching or the folding of a 3D modeled object displayed on the screen.

The GUI may for example display data 250 related to the displayed product 200, as already discussed. In the example of FIG. 1, the data 250, displayed as a "feature tree", and their 3D representation 200 pertain to a brake assembly including brake caliper and disc. The GUI may further show various types of graphic tool 130, 160, 170, 180 for example for facilitating 3D orientation of the object, for triggering a simulation of an operation of an edited product or render various attributes of the displayed product 200.

Figure 3:
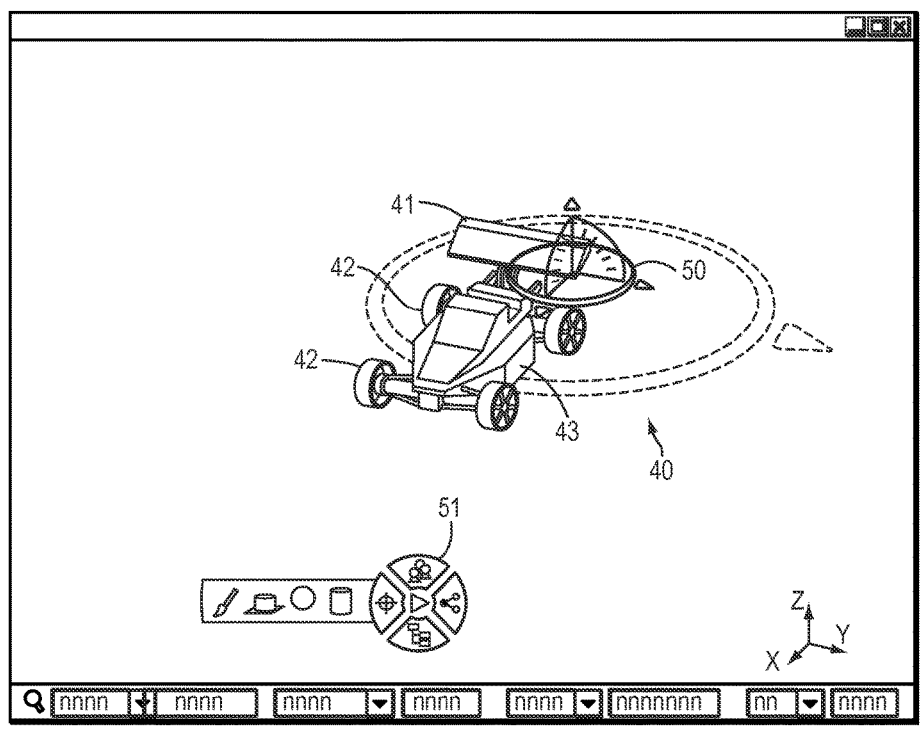
Figure 4:
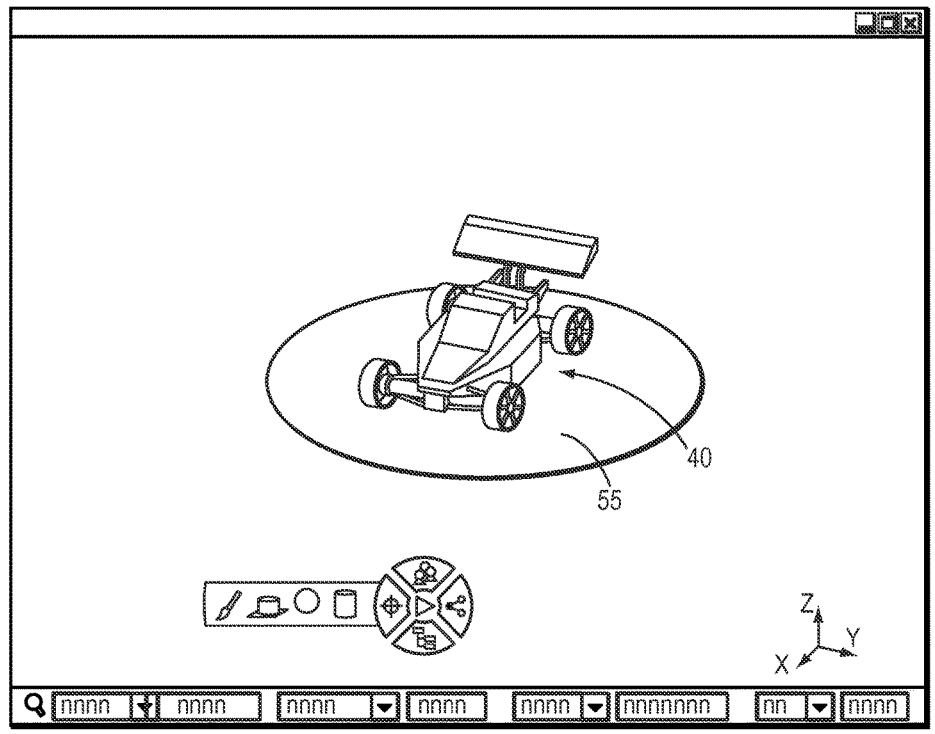

Different examples of the method are now illustrated with reference to the figures. When a user opens a product or creates a new one, he may first access to an edition mode view in the edition workbench. An edition mode view of a remote control car 40 product is provided in FIG. 3. The car 40 of FIG. 3 comprises 3D modeled objects, such as a spoiler 41, wheels 42, and a body 43 which are visible in the edition mode, as well as other objects such as engine components which are not visible in the edition mode, as they are hidden notably by the body 43. The user may want to edit the product. For that, it is convenient to display a 3D representation of the hierarchy of the modeled objects (41, 42, 43). The user thus switches to navigation mode in a navigation workbench for example. This can be done by the user by any haptic action provided by the CAD system used. For example a double click on South Compass 50 or a simple click on South tooltip 51 is a possible action. Any other action may be done to switch modes. FIG. 4 illustrates the same car 40 product as FIG. 3 but represented in navigation mode. The same action or another action may be performed to switch back to edition mode. Conversely, the user may directly be in navigation mode when launching the system, or the system may present no distinction between the edition mode and the navigation mode.

Figure 5:
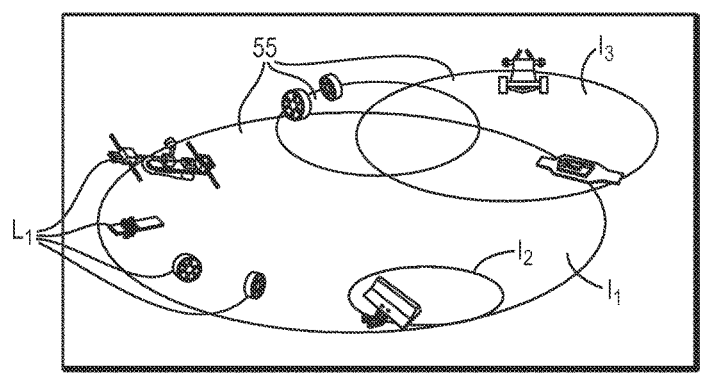

In FIG. 4, the hierarchy of the 3D modeled objects (41, 42, 43) comprised in car 40, hereafter referred to as the hierarchy, is shown at its root level. Indeed, in FIG. 4, the assembled car 40 is displayed. However, the hierarchy may have other representations. For example, FIG. 5 illustrates another representation of the hierarchy. In FIG. 5, intermediate levels of the representation are displayed in an expanded view. Leaf levels of the representation are displayed in a collapsed view.

Figures 6, 7:
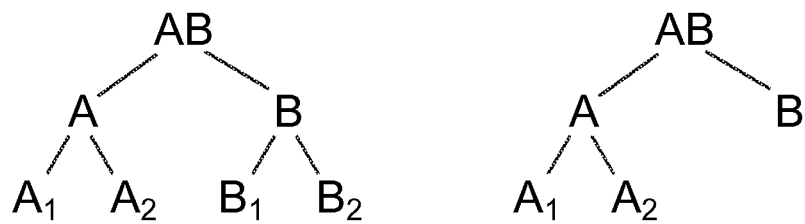
FIGS. 6-7 are illustrations of the concept of hierarchy and representation of hierarchy.

As mentioned earlier, a hierarchy is a structure between the objects of a product. The objects are gathered in levels, which are themselves gathered in levels, and so on. Thus, a hierarchy has leaf levels (i.e. the lowest levels), and intermediate levels (i.e. levels which consists in the gathering of other levels). Each level encompasses a certain number of the objects of the hierarchy. In a hierarchy, if a level $N_1$ encompasses all the objects of another level $N_2$, $N_2$ is a sublevel of $N_1$. In a hierarchy of a product, leaf levels are the objects of the product. Thus they do not have sublevels. FIG. 6 shows an example of a hierarchy with objects $A_1$, $A_2$, $B_1$ and $B_2$, thus leaf levels $A_1$, $A_2$, which are sublevels of intermediate level A, and leaf levels $B_1$ and $B_2$, which are sublevels of intermediate level B. Intermediate levels A and B are sublevels of intermediate level AB, which is the root level of the hierarchy in this example.

A representation of a hierarchy is a view of a set of levels of the hierarchy. In other words, a representation is a view of a part of all the levels of a hierarchy. FIG. 7 shows a representation of the hierarchy of FIG. 6. As can be seen from FIG. 7, leaf levels $B_1$ and $B_2$ of the hierarchy are not in the representation. Also, intermediate level B of the hierarchy is a leaf level for the representation of the hierarchy.

Referring again to FIG. 5, each intermediate level of the representation is displayed in an expanded view. An expanded view of an intermediate level is a view where all the sublevels of the intermediate level are displayed distinctively one from the other. As intermediate levels of a representation are levels which consist in the gathering of other levels, they do have several sublevels, which can be displayed distinctively. For example, $I_1$ is an intermediate level (the root level in this case) of the representation shown in FIG. 5. Leaf levels $L_1$ and intermediate levels $I_2$ and $I_3$ of the representation are sublevels of intermediate level $I_1$ and are distinctively displayed.

Figure 8:
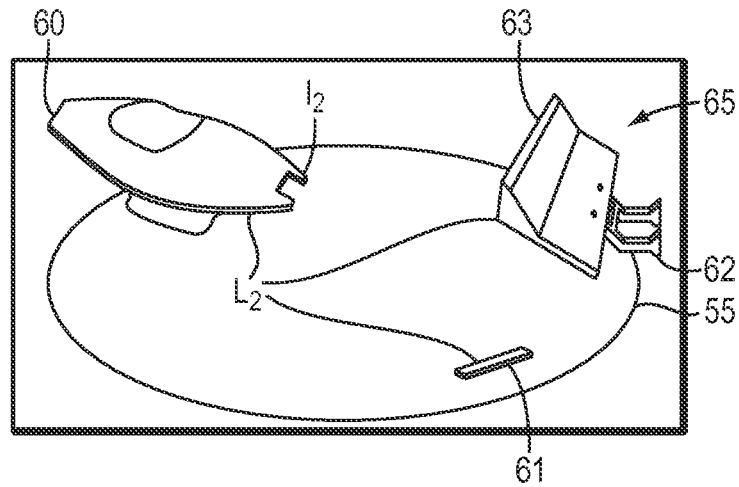

Each leaf level of the representation is displayed in a collapsed view. A collapsed view is a view where all the objects of the leaf level (e.g., objects $B_1$ and $B_2$ of leaf level B in the example of FIG. 7) are displayed collapsed. For example, with reference to FIG. 5 level $I_2$ is an intermediate level, thus displayed in an expanded view. This expanded view is shown in FIG. 8. Sublevels $L_2$, all leaf levels in this example, are displayed distinctively. Leaf sublevel 65 consists of the assembly of a spoiler 63 and a fixation 62. As can be seen from FIG. 8, leaf sublevel 65 is displayed in a collapsed view, as its constituent objects are gathered. To further illustrate this notion of expanded and collapsed view, FIG. 9 shows a collapsed view of level $I_2$.

As illustrated in FIGS. 4, 5 and 8, the expanded view may comprise a turntable 55. This turntable allows the designer to distinguish different levels. On the figures, this turntable takes the form of a "disk", or a "plate", represented in 3D. Other configurations may be implemented. Today Product Structure is already displayed in 3D on turntables to ease user understanding. The functioning of the turntables is described in U.S. patent application Ser. No. 11/312,804 entitled "Method and System for graphically navigating among stored Objects", which is incorporated herein by reference. Each expanded level of the representation of the hierarchy is displayed as a turntable 55 on which are visible its sublevels, that is to say its sub-products, which are intermediate levels of the hierarchy, and/or leaf objects of the hierarchy.

The method may further comprise the step of modifying the representation. Modifying the representation allows the user to navigate in the product when he wants to edit it. The edition is rendered simpler. Modifying the representation is fully explained in U.S. patent application Ser. No. 11/312,804 but briefly discussed here. It may include collapsing an intermediate level of the representation, expanding a leaf level of the representation, or turning a turntable 55.

Figure 9:
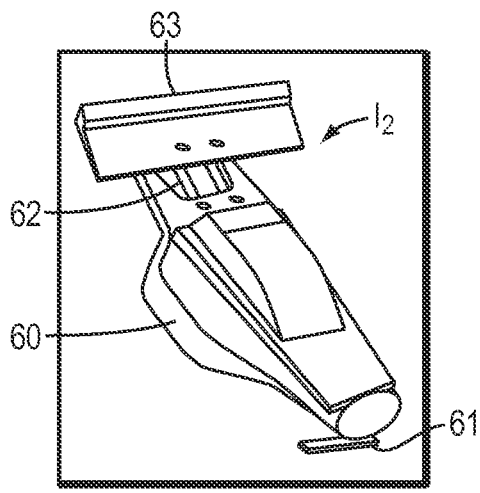
Figure 10:
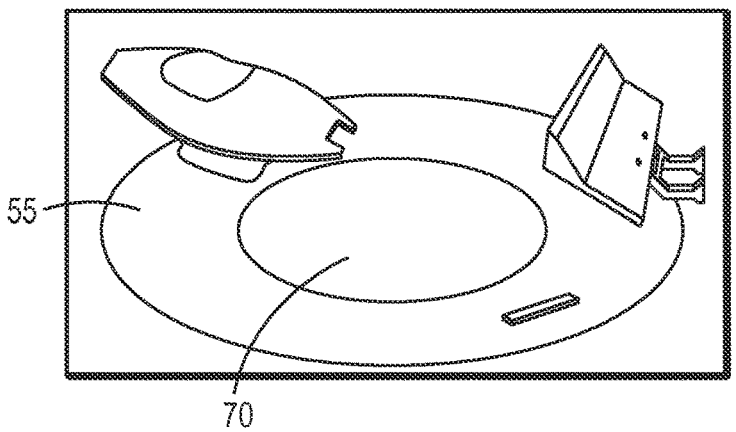

Referring back to FIG. 5, the user may modify the representation by collapsing intermediate level $I_2$, shown in FIG. 8, so as to obtain a collapsed leaf level as shown in FIG. 9. With reference to FIG. 10, this may be accomplished for example by double-clicking on the center zone 70 of the turntable of expanded level $I_2$. Inversely, a collapsed leaf level may be expanded into an intermediate level constituted by sublevel leaf levels and displayed in a collapsed view by double clicking on its 3D representation. With reference to FIG. 9, a user may expand leaf level $I_2$ by double clicking on any object (60, 61, 62, 63) of leaf level $I_2$, thus making it an intermediate level of the representation.

Figure 11:
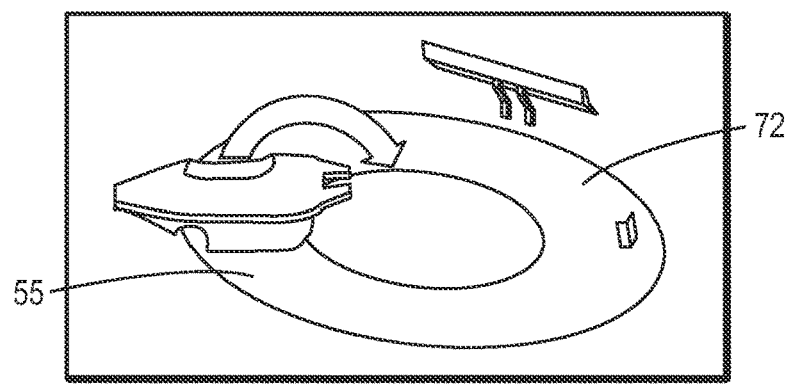

With reference to FIG. 11, a turntable 55 may be turned (i.e. rotated) thus modifying the display and enabling focus on zones of interest to the user, by manipulating an external ring 72. The rotation may be around a Z axis.

Figure 12:
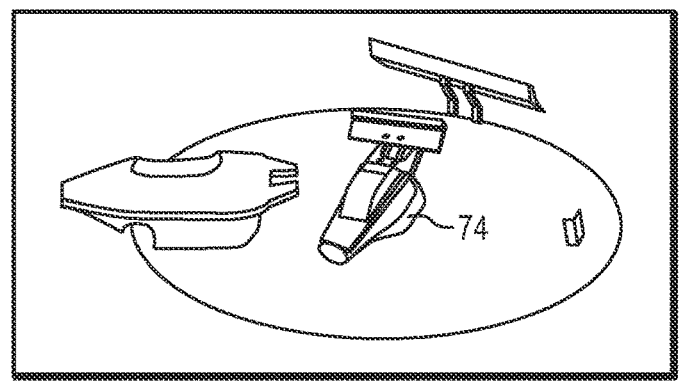
Figure 13:
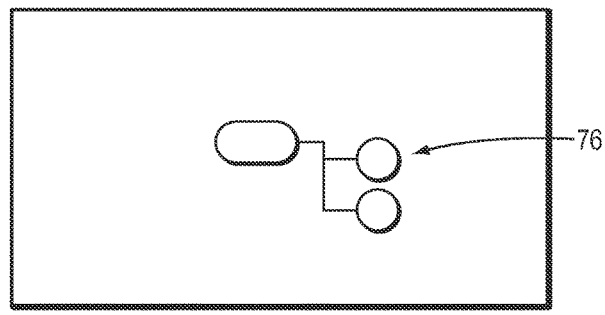

With reference to FIG. 12, the expanded view of an intermediate level may further comprise a snapshot view 74 in the center zone 70 of the turntable 55. The snapshot view 74 allows the user to have a preview of the sub-product corresponding to the intermediate level. This snapshot view may for example be obtained by passing a haptic device, such as a mouse, a short lapse of time on the center zone 70 of FIG. 10. This lapse of time may for example be substantially equal to two seconds, which is a particularly user-friendly amount of time. The system may further provide an option for modifying this lapse of time. The snapshot may be erased by moving the haptic device anywhere outside the center zone 70. For an empty intermediate level, as it has no geometry to represent, it is represented by a default 3D representation 76 that symbolizes a product, such as the one of FIG. 13.

The above operations offer the advantage of being ergonomic. However, other operations may be implemented to perform the modification of the representation. Furthermore, the representation may be modified in other ways, such as zooming in or out a particular sub-level. Different functionalities, such as a functionality to expand all levels in one operation, may also be implemented. Also, at least a part of the above operations may be iterated by the user. Indeed, a user may navigate freely in the product before deciding to edit the hierarchy.

In the following, the steps of selecting at least one object and performing an action on the selected object are detailed though examples with reference to the figures.

As mentioned earlier, the step of selecting may be performed by a user by using a haptic device. After this selection, the action may be performed at least by a drag and drop operation on the selected object. A "drag and drop" operation is an operation in which the user drives the graphical representation of an object, for example through haptic movement, from one location of the screen to another. Alternatively or additionally, the method may comprise a step of presenting a list of actions, for example using phylactery, which is a graphical box containing buttons (e.g. tooltips). The user may then choose the action to be performed among the presented list of actions.

Drag and drop operations are also very useful to quickly rearrange a structure on the turntable view, thereby editing the hierarchy of the product. The operation is simple: drag any item with the mouse and drop it over a destination level. It moves the dragged item into the selected level. A similar manipulation may be performed for duplicate operation: the user can for example hold a specific keyboard key or previously activate a software tool to duplicate the selected item and instantiate it on the destination level selected by the user. The destination of the drop can be either an intermediate or a leaf level of the representation. If it is a leaf level of the hierarchy, a new intermediate level grouping the two objects (the object being dropped and the object of the leaf level) may be created automatically.

Figure 14:
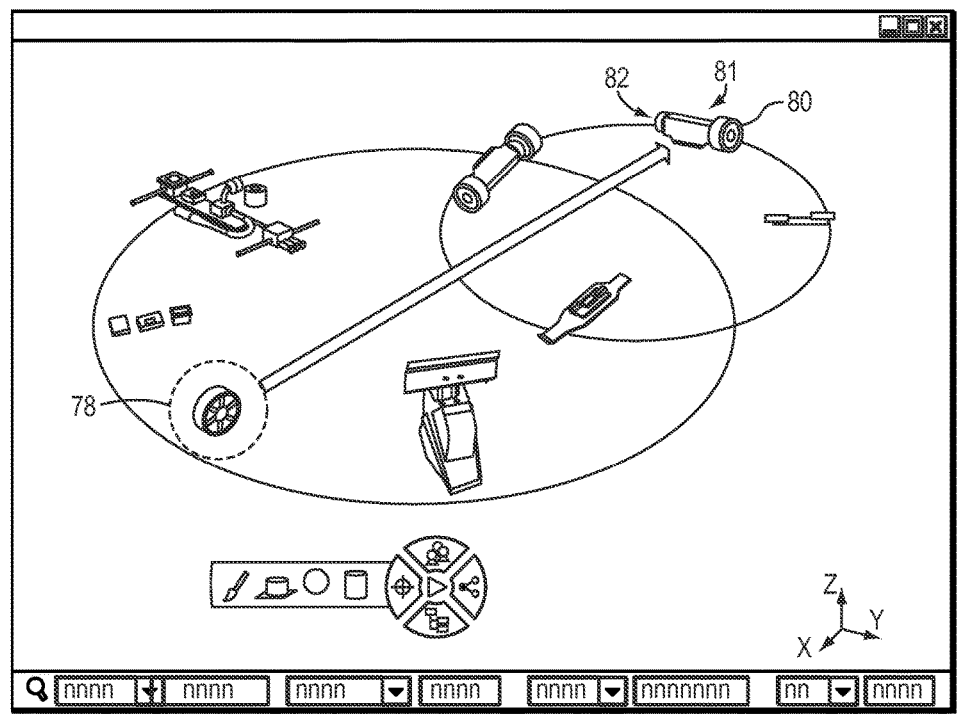
Figure 15:
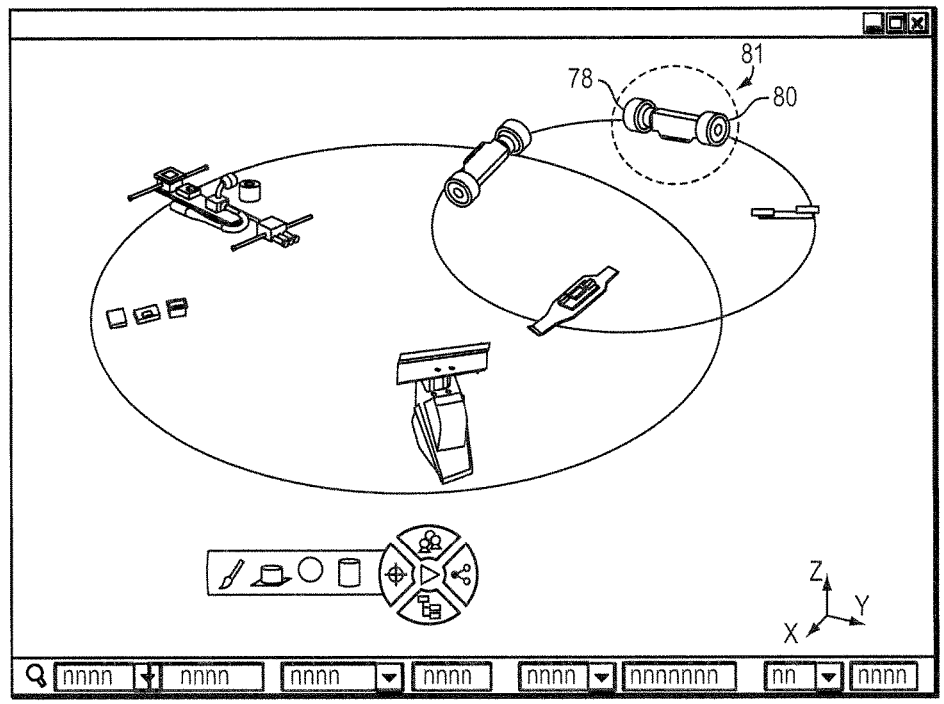

FIG. 14 shows an example of drag and drop operation on wheel 78. The wheel is dropped on level 81. Level 81 is a leaf level of the representation but an intermediate level of the hierarchy. Indeed, level 81 corresponds to an axle with a wheel lacking (thus contains the objects axle bar 82 and wheel 80). The result is shown on FIG. 15. As can be seen from FIG. 15, the wheel 78 was moved in the hierarchy and is now part of level 81. In this example, the drag and drop operation allows moving a selected object in the hierarchy from one level to another.

In the following, examples of actions performed by the use of phylactery are provided. However all the actions described may be performed may be indifferently performed using phylactery, drag and drop operations, toolbar buttons, or keyboard shortcuts, or a combination of the aforementioned.

Figure 16:
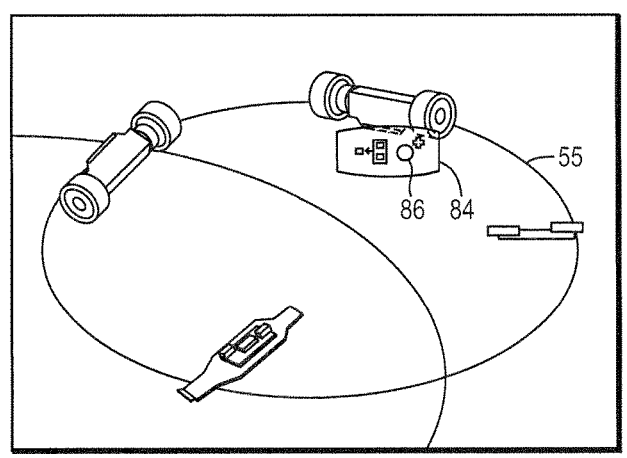

With reference to FIG. 16, when selecting an empty zone anywhere on a turntable 55, thus selecting the level corresponding to the turntable 55 (i.e. selecting all the objects in that level), a phylactery 84 may appear. The user may then act on button 86 for an "insert new" action for inserting a new product at the level selected. The method thus allows inserting a new product at any time. Indeed, as soon as the turntable 55 is selected, a phylactery 84 may appear.

The system may have smart options. For example, with reference to FIG. 17, if the selected level is the root product: only one single icon 86 appears in phylactery 84 corresponding to "Insert new" command. With reference to FIG. 18, if the selected level is a sub-level different from the root, two icons appear. The first one is the "Ungroup" icon 88, corresponding to the ungroup action which will be described later on; the second on is the "Insert new" icon 86. Such smart behavior increases the efficiency of the method for editing a product.

Many implementations may ensure that the "Insert new" icon 86 allows creating a new product on the selected sub-level. For example, with reference to FIG. 19, when clicking on it, a standard "Insert Product" wizard dialog 90 may appear in order for the user to choose the desired attributes for his new product. As a result, a new empty product 76 may appear on the destination sub-level.

Figure 20:
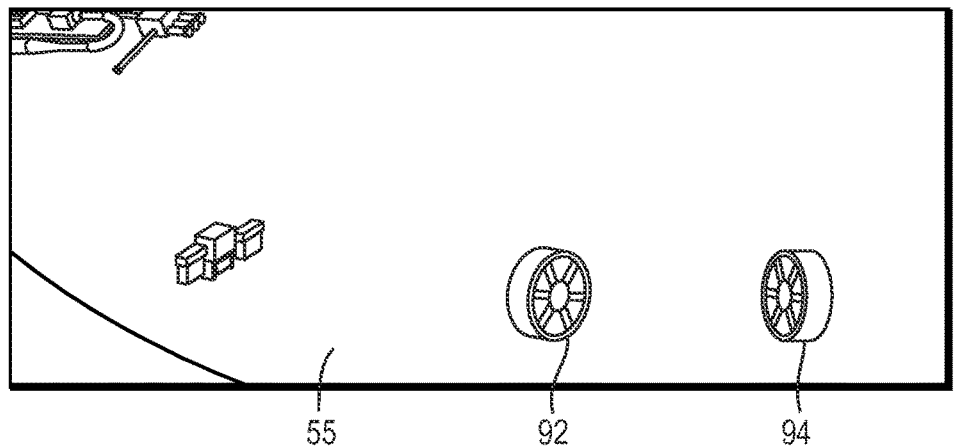

With reference to FIG. 20, when multi-selecting several items, wheel 92 and wheel 94 in the example of the figure, located on the same sub-level (i.e. on the same turntable 55), it is possible to group them into a new product. This command can be very useful when the user wants to quickly rearrange his or her product structure.

Figure 21:
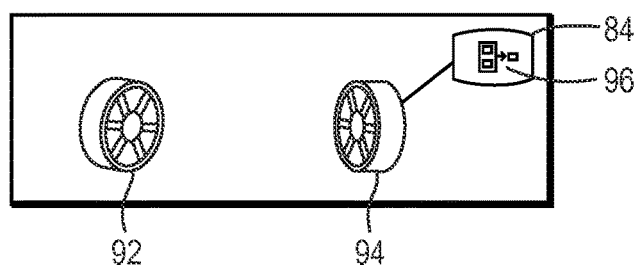
Figure 22:
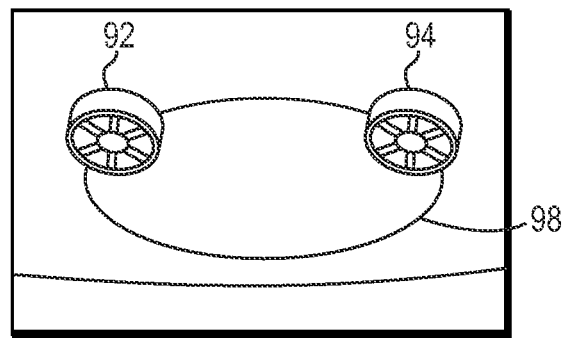

To use this command, the user needs to select several items (92, 94) on the same sub-level (here two wheels are selected). As a result, a phylactery 84 with a unique "Group" icon 96 appears, as shown on FIG. 21. When clicking on this icon 96, the system automatically creates a new product and moves the selected items into this new product. The resulting view is shown in expanded view in FIG. 22. As shown, a new intermediate level 98 with wheels 92 and 94 has been created Similarly to the "Group" operation described above, the "Ungroup" operation allows removing a product sub-level and re-parenting the underlying items to the father of the deleted sub-level. In other words, if a product A contains a product B that contains two products C and D, if the user selects B and use the "Ungroup" command, the system will delete product B and move product C and D directly under product A.

Figure 23:
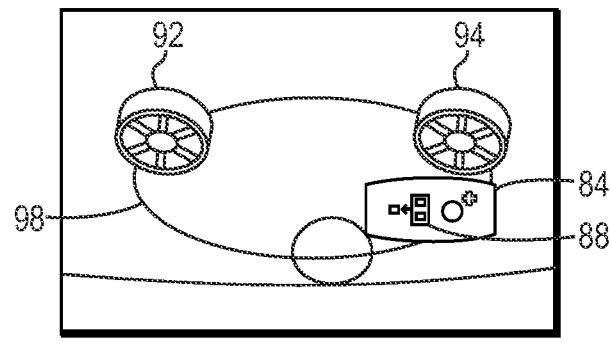
Figure 24:
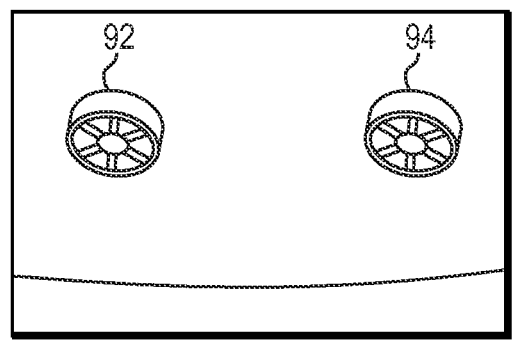

Therefore, with reference to FIG. 23, the user needs to select a sub-level, for example level 98 containing wheels 92 and 94 (it cannot be the root level if the smart option described above is implemented). Then a phylactery 84 appears with two icons. The first one is the "Ungroup" icon 88. When clicking on it, the selected sub-level is deleted and the sub-items contained in it are re-parented to the father of the deleted sub-level. The resulting view is shown in FIG. 24. As can be seen, the intermediate level 98 has been removed.

The above explanations with reference to FIGS. 14-24 provided specific examples of the step of selecting and performing an action of the method, in the specific case of the use of turntables.

More generally, the action may be a deletion of the selected object from the hierarchy, a deletion of an intermediate level of the hierarchy including the selected object, a duplication of the selected object in the hierarchy, a move of the selected object in the hierarchy, an insertion of another object at an intermediate level of the hierarchy including the selected object, a grouping of the selected object, or an ungrouping of the selected object, or any combination of the aforementioned actions. Indeed, when selecting an object, not only an action may be performed on the selected object, but also an action may be performed on an intermediate level of the hierarchy comprising the object. This level may be a leaf level of the representation of the hierarchy. This allows fast edition of the product, as similar operations may be performed whatever the representation. That way, the user does not need to access to a specific representation of the hierarchy for performing an action.

Furthermore, at least two objects may be selected at the step of selecting. The action may then comprise a grouping of the selected objects. As mentioned earlier, a grouping of several objects consists in creating a new intermediate level in the hierarchy which contains the several objects. The actions may also comprise moving, or deleting, or duplicating the selected objects, or any action described earlier with reference to the selection of one sole object.

Conversely, all the objects of a same leaf level of the representation may be selected at the step of selecting. Alternatively, all the objects of a same intermediate level of the representation may be selected. The action may then comprise an ungrouping of the selected objects. These functionalities provide the user with means to make sophisticated editions to a product.

The step of performing modifies the displayed representation of the hierarchy. Indeed, as the hierarchy is modified upon the action being performed, the representation is also modified. Therefore, the view displayed to the user is different. This is particularly useful as the user observes the impact of his actions directly on the screen. The user may then easily undo actions that do not lead to a wanted result.

Thanks to the invention method, the designer may edit a product fully in 3D. 2 D specification tree are not required anymore.

A product lifecycle management system may comprise a database storing at least one product comprising 3D modeled objects and a graphical user interface suitable for performing the above method upon user actions.

A computer readable storage medium may also have recorded thereon instructions for execution by a computer 500 (FIG. 25), the instructions comprising means for causing a product lifecycle management system comprising a database storing at least one product comprising three-dimensional modeled objects to perform the above method upon user actions.

Figure 25:
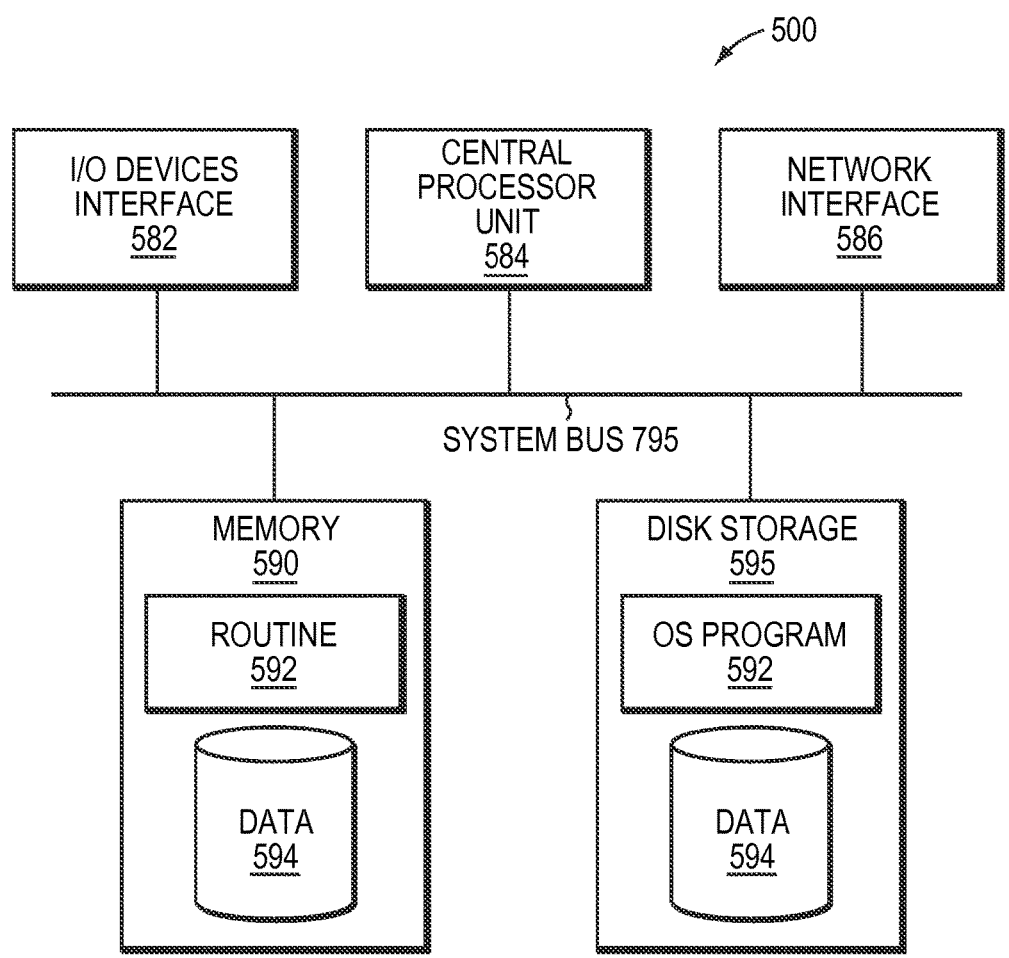
FIG. 25 is a block diagram of a computer node embodying the present invention.

In general, such a system 500 may be supported on hardware as conceptually (non-limiting) illustrated in FIG. 25. The database 594 may be stored in at least one memory 590, 595 location of such hardware. The system 500 comprises a processor 584. The graphical user interface may include a screen for displaying and a tool for a designer to make the processor 584 perform actions, based on different instructions 592 contained in the memory 590, 595. This tool is typically a haptic tool, such as a mouse, or a touch screen. The graphical user interface (i.e. display monitor/screen and tool) communicates with processor 584 through I/O interface 582 and sometimes network interface 586. The computer 500 contains a system bus 795, where a bus is a set of hardware lines used for data transfer among the components of a computer or processing system 500. Bus 795 is effectively a shared conduit that connects different elements of computer system 500, (e.g. processor 584, disk storage 595, memory 590, input/output ports, network ports, etc.) that enables the transfer of information between the elements. Network interface 586 allows the computer 500 to connect to various other devices/computers attached to a communications network. The communications network can be part of a remote access network, a global computer network (e.g. the Internet), a worldwide collection of computers, local area or wide area computer networks, and gateways that use respective protocols (TCP/IP, Bluetooth, etc.) to communicate with one another. Other electronic device/computer network architectures are suitable.

This new concept notably allows a user to directly modify a Product Structure in 3D, using the turntable paradigm. The invention is characterized by its functional behavior and to its user interface.

It is to be understood that the method can be applied to any object in any configuration capable of being defined by a CAD/CAM/CAE system, or any system used to display views of an object from varying viewpoints. The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may generally be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language or in assembly or machine language if desired; and in any case, the language may be a compiled or interpreted language.

Generally, a processor 584 will receive instructions 592 and data 594 from a read-only memory and/or a random access memory 590, 595. Storage devices suitable for tangibly embodying computer program instructions 592 and data 594 include all forms of nonvolatile memory 595, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially designed ASICs (application-specific integrated circuits).

The invention has been described with reference to preferred embodiments. However, many variations are possible within the scope of the invention. For example, the invention was mainly described with reference to the field of mechanical engineering. However, the invention applies to the field of Systems engineering in general, in particular 3D for Systems or Space Allocation Mock-up management. The invention also applies to any field where an assembly of a plurality of objects may be composed, such as video games. Accordingly, the scope of the present invention is intended to embrace all such alternatives, modifications, and variations together with all equivalents thereof.

Furthermore, the invention was mainly described with reference to turntable based systems. However, the invention may be applied to any system implementing a hierarchy between objects modeling a product.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for editing a product in a system of computer-aided design (CAD), computer-aided manufacturing (CAM), and computer-aided engineering (CAE), the product comprising three-dimensional modeled objects, the method comprising the steps of:

displaying a three-dimensional representation of a hierarchy of the three-dimensional modeled objects of the product, the hierarchy having leaf levels being the lowest levels of the hierarchy, and intermediate levels being non-leaf levels of the hierarchy, the three-dimensional modeled objects being displayed three-dimensionally in the representation, the intermediate levels of the representation being displayed in a first expanded view and the leaf levels of the representation being displayed in a collapsed view, the first expanded view comprising a first turntable, and the representation being modifiable by collapsing an intermediate level of the representation, by expanding a leaf level of the representation, and/or by turning the first turntable, at least one leaf level of the displayed representation being a leaf level of the hierarchy, the collapsed view of a leaf level of the hierarchy being a three-dimensional view of the three-dimensional modeled object corresponding to said leaf level;

selecting at least one of the displayed three-dimensional modeled objects, performing an action on the selected object, wherein performing the action comprises a drag and drop operation, the drag and drop operation being dragging the selected three-dimensional modeled object of the leaf level of the hierarchy, to a destination object, which is a displayed leaf level of the hierarchy, the drag and drop operation being within the three-dimensional representation of the hierarchy of the three-dimensional modeled objects, the hierarchy being edited upon the performing of the action, wherein the hierarchy being edited upon performing of the action includes editing the hierarchy structure of the product by automatically creating a new intermediate level including, as separate children levels of the new intermediate level, (i) the destination object and (ii) the selected object, and in response to performing the action, automatically creating a second expanded view of the new intermediate level including the first turntable and a second turntable, the second turntable being displayable and turnable upon user-action, the second turntable distinctively displaying the three-dimensional objects of the new intermediate level, including the three-dimensional objects of the destination object and the selected object;

wherein the second expanded view displays the first turntable and second turntable concurrently.

2. The method of claim 1, wherein the expanded view of an intermediate level further comprises a snapshot view in the center of the turntable.

3. The method of claim 1, further comprising the step of modifying the representation.

4. The method of claim 3 wherein the step of modifying the representation includes at least one of:
collapsing an intermediate level of the representation,
expanding a leaf level of the representation, and
turning a turntable.

5. The method of claim 1 further comprising a step of presenting a list of actions after the step of selecting, the action performed being chosen among the presented list of actions.

6. The method of claim 1, wherein displaying the three-dimensional representation of the hierarchy of the three-dimensional modeled objects further includes always fitting the whole hierarchy in a single screen.

7. The method of claim 1 wherein the step of performing modifies the displayed representation of the hierarchy.

8. A product lifecycle management non-transitory system comprising:
a database storing at least one product comprising three-dimensional modeled objects in a system of computer-aided design (CAD), computer-aided manufacturing (CAM), and computer-aided engineering (CAE); and
a processor configured to implement a graphical user interface suitable for:
displaying to a user a three-dimensional representation of a hierarchy of the three-dimensional representation of the modeled objects of the product, the hierarchy having leaf levels being the lowest levels of the hierarchy, and intermediate levels being non-leaf levels of the hierarchy, the intermediate levels of the representation being displayed in a first expanded view and the leaf levels of the representation being displayed in a collapsed view, the first expanded view comprising a first turntable, and the representation being modifiable by collapsing an intermediate level of the representation, by expanding a leaf level of the representation, and/or by turning first turntable, at least one leaf level of the displayed representation being a leaf level of the hierarchy, the collapsed view of a leaf level of the hierarchy being a three-dimensional view of the three-dimensional modeled object corresponding to said leaf level; and
upon selection by the user of at least one of the displayed three-dimensional modeled objects, performing an action on the selected object, wherein performing the action comprises a drag and drop operation, the drag and drop operation being dragging the selected three-dimensional modeled object of the leaf level of the hierarchy, to a destination object, which is a displayed leaf level of the hierarchy within the three-dimensional representation of a hierarchy of the three-dimensional representation of the modeled objects, editing the hierarchy, wherein editing the hierarchy includes editing the hierarchy structure of the product by automatically creating a new intermediate level including as separate children levels of the new intermediate level (i) the destination object and (ii) the selected object, and creating a second expanded view of the new intermediate level including the first table and a second turntable, the second turntable being displayable and turnable upon user-action, the second turntable distinctively displaying the three-dimensional objects of the new intermediate level, including the three-dimensional objects of the destination object and the selected object;

wherein the second expanded view displays the first turntable and second turntable concurrently.

9. A non-transitory computer readable storage medium having recorded thereon instructions for execution by a computer, the instructions comprising means for causing a product lifecycle management system comprising a database storing at least one product comprising three-dimensional modeled objects in a system of computer-aided design (CAD), computer-aided manufacturing (CAM), and computer-aided engineering (CAE) to:
display to a user a three-dimensional representation of a hierarchy of the three-dimensional representation of the modeled objects of the product, the hierarchy having leaf levels being the lowest levels of the hierarchy, and intermediate levels being non-leaf levels of the hierarchy the intermediate levels of the representation being displayed in a first expanded view and the leaf levels of the representation being displayed in a collapsed view, the first expanded view comprising a first turntable, and the representation being modifiable by collapsing an intermediate level of the representation, by expanding a leaf level of the representation, and/or by turning the first turntable, at least one leaf level of the displayed representation being a leaf level of the hierarchy, the collapsed view of a leaf level of the hierarchy being a three-dimensional view of the three-dimensional modeled object corresponding to said leaf level; and
upon selection by the user of at least one of the displayed three-dimensional modeled objects, performing an action on the selected object, wherein performing the action comprises a drag and drop operation, the drag and drop operation being dragging the selected three-dimensional modeled object of the leaf level of the hierarchy, to a destination object which is a displayed leaf level object within the three-dimensional representation of a hierarchy of the three-dimensional representation of the modeled objects, editing the hierarchy structure of the product by automatically creating a new intermediate level including as separate children levels of the new intermediate level (i) the destination object and (ii) the selected object, and creating a second expanded view of the new intermediate level including the first turntable and a second turntable, the second turntable being displayable and turnable upon user-action, the second turntable distinctively displaying the three-dimensional objects of the new intermediate level, including the three-dimensional objects of the destination object and the selected object;

wherein the second expanded view displays the first turntable and second turntable concurrently.

\* \* \* \* \*